United States Patent [19]

Irmer

[11] 4,193,426
[45] Mar. 18, 1980

[54] PLASTIC SOCKET PIPE PART

[75] Inventor: Adolf Irmer, Geeste, Fed. Rep. of Germany

[73] Assignee: Wavin B.V., Zwolle, Netherlands

[21] Appl. No.: 898,688

[22] Filed: Apr. 21, 1978

[51] Int. Cl.² ............................................. F16L 47/00
[52] U.S. Cl. ................................. 138/109; 277/207 A
[58] Field of Search .............................. 138/109, 103; 277/207 A; 285/110, 379, 423

[56] References Cited

U.S. PATENT DOCUMENTS

| | | | |
|---|---|---|---|
| 3,349,805 | 10/1967 | Fried | 138/109 |
| 3,857,589 | 12/1974 | Oostenbrink | 277/207 A |
| 4,046,387 | 9/1977 | Lee | 285/110 |

*Primary Examiner*—Lenard A. Footland
*Attorney, Agent, or Firm*—Wilkinson, Mawhinney & Theibault

[57] ABSTRACT

A thermoplastic socket pipe part with a sealing member comprising a sealing head and sealing sleeve, the sealing head being retained by means of a retaining ring, which retaining ring is formed by bending back the end part of an extruded plastic tube provided with three widenings with decreasing inner diameter as seen from the free end of the plastic tube.

3 Claims, 3 Drawing Figures

PLASTIC SOCKET PIPE PART

BACKGROUND OF THE INVENTION

The invention relates to a plastic socket pipe part comprising a first widening adjoining the pipe part, a second widening adjoining the first widening having an internal diameter exceeding the diameter of the first widening, a retaining ring of at least a J-shaped cross section connected with the second widening, said retaining ring being used for retaining a head portion forming part of a sealing member, the head portion being connected with a sealing sleeve which can be received within the second widening, whereas the space in between the free end of the retaining ring and the socket part facing said retaining ring, is smaller than the head portion.

A plastic socket pipe part of this type in the form of an injection-moulded plastic pipe part, whereby the outer side of the second widening engages a removable retaining ring, which so engages the outer side of the second widening that the retaining ring is able to slide axially along a small distance, is known.

A disadvantage of said known plastic socket pipe is that at present one has to start from an injection-moulded plastic socket pipe part, so that the costs incurred in manufacturing such a plastic pipe part, are extremely high.

SUMMARY OF THE INVENTION

An object of the present invention is to provide a plastic socket pipe part as described above which does not require an injection-moulded plastic pipe part, but whereby an extruded pipe part can be used.

Another object of the invention is to provide a method and apparatus for manufacturing such a plastic socket pipe part and retaining ring in an uncomplicated and inexpensive way.

The invention thus relates to a plastic socket pipe part comprising a first widening adjoining the pipe part, a second widening adjoining the first widening having an internal diameter exceeding the diameter of the first widening, a retaining ring of at least a J-shaped cross section connected with the second widening, said retaining ring being used for retaining a head portion forming part of a sealing member, the head portion being connected with a sealing sleeve which can be received within the second widening, whereas the space in between the free end of the retaining ring and the socket part facing said retaining ring is smaller than the head portion, the second widening of an extruded plastics pipe part, which extends into a third widening having about the same wall thickness but an internal diameter exceeding the diameter of the second widening, an end part of which is bent back toward the second widening, thereby forming the retaining ring having at least a J-shaped cross section.

Preferably the end part of the third widening is bent back in a substantial axial manner.

The cross section of the bent back end part of the third widening is appropriately U-shaped and the extremity of the curved third widening ends preferably opposite the transition in between the third widening and an inclined wall part which adjoins the second widening.

An extremely good fixing of the head part of the sealing member is ensured in this manner, so that it cannot possibly be drawn out of the retaining ring, whereas on the other hand bending the extremity of the third widening can be performed in a very simple manner, as will be described hereinafter.

The wall thickness of the pipe part, the first widening, the second widening and the third widening are expediently nearly identical.

Suitable thermoplastic material for a socket pipe of the invention is polyvinylchloride, but other materials are also suitable.

The invention further relates to a method of manufacturing a plastic socket pipe part of this type having a first widening adjoining said pipe part, a second widening adjoining the first widening and having an internal diameter exceeding the diameter of the first widening, a retaining ring connected with the second widening having at least a J-shaped cross section for accomodating an annular head portion of a sealing member said head portion being connected with a sealing sleeve to be received within the second widening, and the space between the extremity of the retaining ring and the opposite socket end being smaller than the head portion, wherein starting from an initially extruded pipe part having a second widening which widening extends into a third widening having about the same wall thickness and an internal diameter which exceeds the diameter of the second widening and after having accommodated the annular head portion the end part of the third widening is bent back so that a retaining ring is formed having at least a J-shaped cross section.

During a first stage of the manufacture the end part of the third widening is expediently bent back, until said end substantially extends radially, whereafter in a second stage said radially extending end part will be further bent back until same substantially axially extends and the free end ends preferably opposite the transition in between the third widening and an inclined wall part, which connects the third widening with the second widening.

SURVEY OF THE DRAWINGS

DESCRIPTION OF A PREFERRED EMBODIMENT

Figure 1:
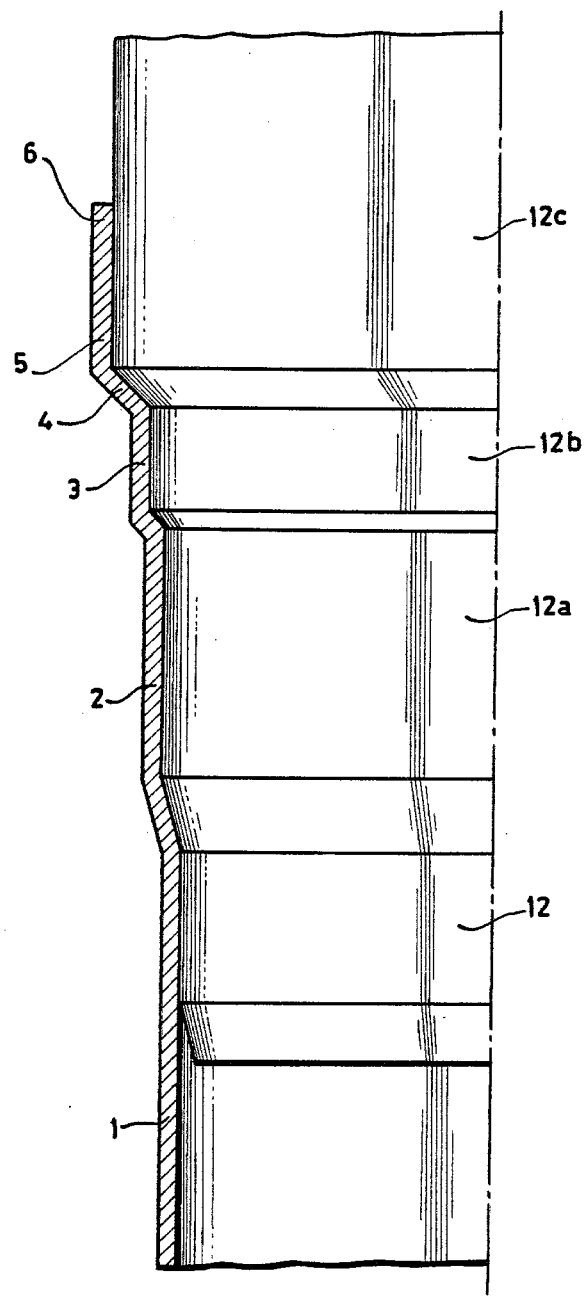
FIG. 1 shows a plastic socket pipe part before the end part is bent back.
Figure 2:
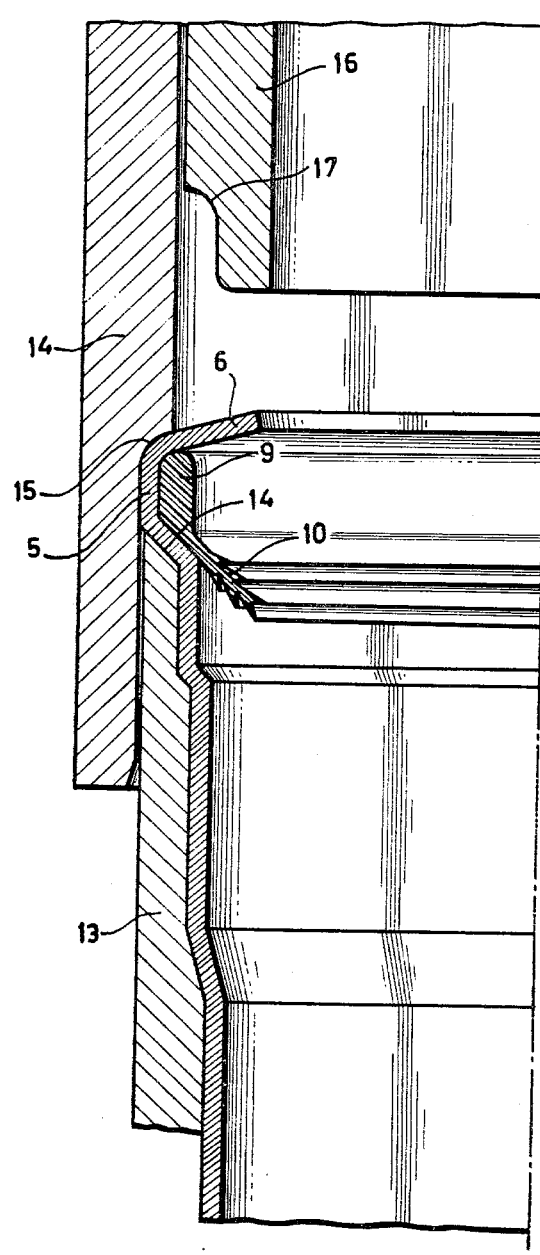
FIG. 2 shows a first stage of the formation of a retaining ring in a plastic socket pipe part.

FIG. 1 shows an extruded plastic pipe part 1 of a thermoplastic material, for instance consisting of polyvinylchloride, having a first widening 2, the internal diameter of which exceeds the diameter of the pipe part 1. The first widening 2 extends toward a second widening 3. The second widening 3 merges through an inclined wall part 4, in a third widening 5. The end part 6 of the widening 5 is so curved that same extends again axially. The free end 7 of the curved end part 6 of the third widening 5 expediently ends opposite the transition 8 in between the third widening 5 and the inclined wall part 4.

In the space formed by the third widening 5 and its bent back end part 6, there is a head portion 9 of a sealing member. Said head portion 9 is connected with an annular sealing sleeve 10 which can be received in the second widening 3.

The distance between the free end 7 of the curved end part of the third widening 5 and the opposite part 11 of the socket has been so chosen that the head portion 9 cannot possibly be drawn out of said aperture.

As can be seen, the wall thickness of the extruded pipe part 1, the first widening 2, the second widening 3 and the third widening 5 as well as the end part 7, are almost identical.

The manufacture of a plastic socket pipe part of this type and a retaining ring is very simple, since machine-made extruded plastic pipe parts can be used.

The formation of a plastic pipe part in accordance with the invention, is carried out as follows.

A plastic pipe part 1 is slid upon a mandril having a first mandril part 12, an adjoining second mandril part 12a, with a diameter exceeding the diameter of the first mandril part 12 and a third mandril part 12b adjoining the second mandril part 12a. In this manner the first widening 2 and the third widening 5 of the plastic pipe part are formed.

Mandril part 12c forms the third widening 5 (FIG. 1).

The end part 6 of the second widening 5 is subsequently heated to over the deformation of plasticizing temperature (e.g. to 140° C. for polyvinylchloride) and the outer side of the pipe 1 comprising a first widening 2 and a second widening 3 is subsequently encircled by a first external mould 13 which is provided with an end wall 14, adapted to the position of the wall part 4.

By means of a second external mould part 14 with an adapted aperture 15 the end part 6 of the third widening is radially bent, after disposing the head portion 9 of the sealing member which is connected with the sealing sleeve 10.

Figure 3:
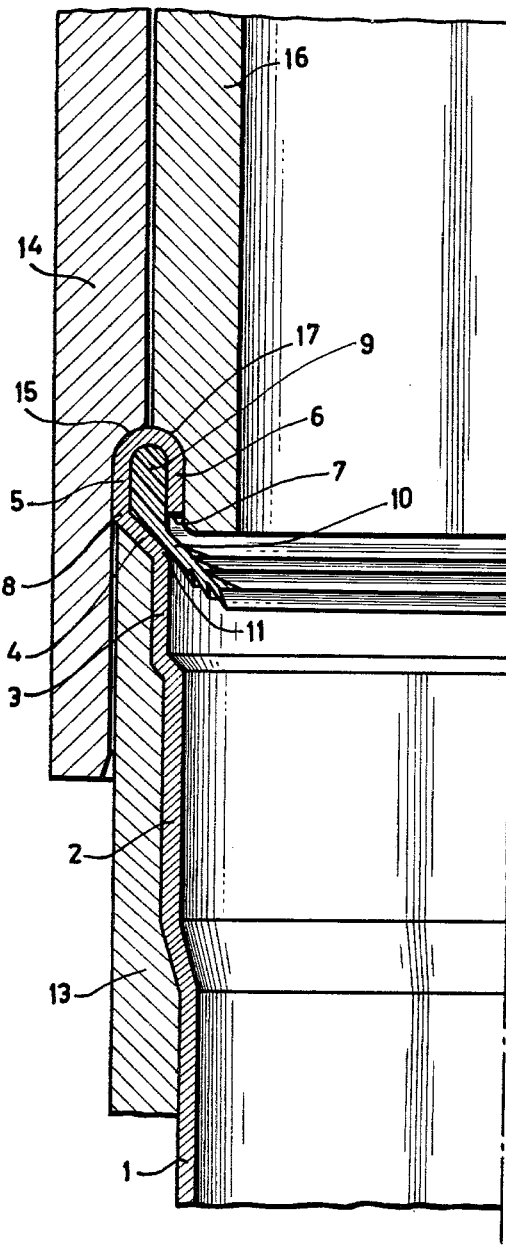
FIG. 3 shows a second stage of the formation of a retaining ring in a socket of a plastic pipe part as shown in FIG. 2.

By means of a third external mould part 16 which is likewise provided with a recess 17, the end part 6 still to be deformed is bent inwardly until same extends substantially axially (FIG. 3). Thus it will be seen that, when completed, the end part 6 is rebent to extend substantially parallel to the third widening 5. In this position the head portion 9 is trapped between said parallel portions, while the annular sealing sleeve 10 extends therefrom.

The internal diameter at the location of the curved axially extending end part 6 of the third widening 5 and the internal diameter of the second widening, are substantially identical.

It is to be noted that it is a very surprising fact that in this manner from an extruded pipe the retaining ring can be formed by means of a third widening 5 having an end part 6 by applying only simple equipment.

What I claim is:

1. A plastic pipe socket part comprising a first widening, a second widening adjoining the first widening and having an internal diameter exceeding the diameter of the first widening, wherein the second widening extends into a third widening having substantially the same wall thickness but having an internal diameter exceeding the diameter of the second widening, an end part of said third widening being rebent in spaced but substantially parallel relation to an intermediate part thereof, sealing means of substantially J-configuration in cross section and having a head portion disposed in said space, and a sealing sleeve portion extending in the direction of said second widening, whereby to form a retaining ring, the terminus of the rebent portion being disposed in proximity to the plastic pipe socket part a distance less than the thickness of the head of said sealing means whereby to retain said head portion in said space while permitting said sealing sleeve portion to extend therefrom.

2. A plastic pipe socket part according to claim 1, wherein the rebent portion is of substantially U-shaped cross section.

3. A plastic pipe socket part comprising a first widening, a second widening adjoining the first widening and having an internal diameter exceeding the diameter of the first widening, wherein the second widening extends into a third widening having substantially the same wall thickness but having an internal diameter exceeding the diameter of the second widening, an end part of said third widening being rebent in spaced but substantially parallel relation to an intermediate part thereof, sealing means of substantially J-configuration in cross section and having a head portion disposed in said space, and a sealing sleeve portion extending in the direction of said second widening, whereby to form a retaining ring; and wherein said plastic pipe part, the first widening, the second widening and the third widening, each having a wall thickness which is substantially identical.

* * * * *